United States Patent
Abella et al.

(10) Patent No.: US 8,965,981 B2
(45) Date of Patent: Feb. 24, 2015

(54) METHOD AND APPARATUS FOR BOTNET ANALYSIS AND VISUALIZATION

(75) Inventors: Alicia Abella, Morristown, NJ (US);
David Gross, South River, NJ (US);
Philip Isenhour, Blacksburg, VA (US);
Jeremy Wright, Berkeley Heights, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1029 days.

(21) Appl. No.: 12/626,309

(22) Filed: Nov. 25, 2009

(65) Prior Publication Data

US 2011/0126136 A1    May 26, 2011

(51) Int. Cl.
*G06F 15/16* (2006.01)
*H04L 29/06* (2006.01)
*H04L 12/26* (2006.01)

(52) U.S. Cl.
CPC .......... *H04L 63/1408* (2013.01); *H04L 43/028* (2013.01); *H04L 43/045* (2013.01); *H04L 43/067* (2013.01)
USPC ......... 709/206; 709/204; 709/205; 379/93.01

(58) Field of Classification Search
CPC ... H04L 43/028; H04L 43/045; H04L 43/067; H04L 63/1408; H04L 43/04; H04L 43/06; H04L 43/062; H04L 43/065; H04L 43/08; H04L 2463/144; H04L 63/1425; H04L 63/1416; H04L 63/1441; H04L 63/1491; H04L 61/1511; G06F 17/30699; G06F 17/30719
USPC ................................ 709/204–206; 379/93.01
See application file for complete search history.

(56) References Cited

U.S. PATENT DOCUMENTS

| 7,162,698 | B2 * | 1/2007 | Huntington et al. .......... 715/736 |
|---|---|---|---|
| 2008/0028463 | A1 | 1/2008 | Dagon et al. |
| 2008/0052299 | A1 * | 2/2008 | Shinke et al. ................. 707/100 |
| 2008/0080518 | A1 | 4/2008 | Hoeflin et al. |
| 2008/0094250 | A1 * | 4/2008 | Myr .............................. 340/909 |
| 2008/0133197 | A1 * | 6/2008 | Bang et al. ...................... 703/11 |
| 2009/0018819 | A1 | 1/2009 | Wright et al. |
| 2009/0112932 | A1 * | 4/2009 | Skierkowski et al. ..... 707/104.1 |
| 2010/0177120 | A1 * | 7/2010 | Balfour ......................... 345/647 |
| 2010/0214313 | A1 * | 8/2010 | Herman et al. ............... 345/593 |
| 2011/0078143 | A1 * | 3/2011 | Aggarwal ..................... 707/737 |

FOREIGN PATENT DOCUMENTS

EP    1895416 A1 *    3/2008

OTHER PUBLICATIONS

U.S. Appl. No. 12/325,157, filed Nov. 29, 2008, entitled "Systems and Methods for Detecting and Coordinating Changes in Lexical Items".

* cited by examiner

*Primary Examiner* — Phuoc Nguyen
*Assistant Examiner* — Davoud Zand
(74) *Attorney, Agent, or Firm* — Wolff & Samson, PC

(57) ABSTRACT

A method and apparatus for botnet analysis and visualization. Network traffic is filtered to compile a list of messages. The identified messages are tokenized, classified, and aggregated and changes in the frequency of tokenized messages are identified. A display of the tokenized messages is generated and displayed via a user interface. The user interface is configured to a allow a user to review data generated based on the filtered network traffic in order to detect potential botnet activity. User input may be used to adjust filtering and tokenization of the messages.

10 Claims, 8 Drawing Sheets

METHOD AND APPARATUS FOR BOTNET ANALYSIS AND VISUALIZATION

BACKGROUND

The present disclosure relates generally to network traffic analysis, and more particularly to botnet analysis and visualization.

The Internet provides users with access to a voluminous amount of information. However, connecting to the Internet also comes with certain risks. One of these is the risk of a user's computer being infected with malicious software.

Internet bots are often configured as malicious software. Internet bots, also referred to as bots, are software applications designed to run tasks automatically and autonomously based on commands from a separate entity. A collection of bots each operating on one of a number of networked computers is referred to as a botnet. Botnets may be commanded and controlled by a bot master who can control the bots of the botnet remotely. Bots of a botnet can be commanded to conduct distributed denial of service attacks or similar operations used to affect another entity's availability or functionality. What is needed is a method of detecting botnets to prevent or lessen the effect of malicious operations.

BRIEF SUMMARY

One embodiment is a method for botnet analysis and visualization. Network traffic is filtered to compile a list of messages. The identified messages are tokenized, classified, aggregated, and changes in the frequency of content and attributes of tokenized messages are identified. A display of the tokenized messages is generated and displayed via a user interface. The user interface is configured to allow a user to review data generated based on the filtered network traffic in order to detect potential botnet activity. User input may be used to adjust filtering and tokenization of the messages.

These and other advantages of the disclosure will be apparent to those of ordinary skill in the art by reference to the following detailed description and the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Bots of a botnet may communicate with one another, one or more botnet command and control entities, or a third party entity. A botnet master transmits commands to bots of the botnet and, in response, the bots perform the commanded operations. The communications of botnet entities can be used to determine the existence of the botnet and allow for appropriate actions to be taken. For example, botnets can be detected by analyzing network traffic between botnet entities to identify the operation of botnets thereby allowing corrective action to be taken if necessary.

Figure 1:
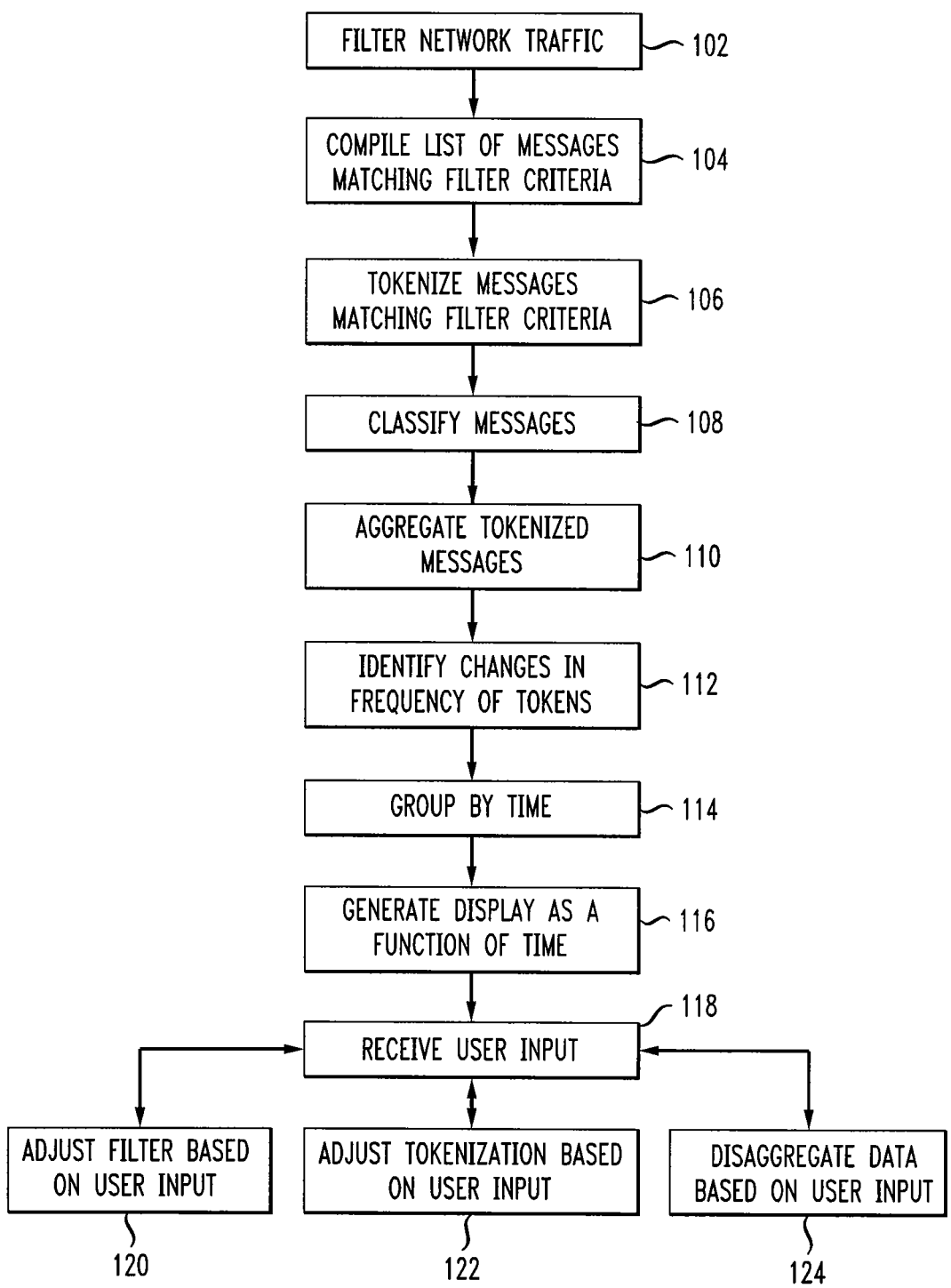
FIG. 1 depicts a flowchart of a method according to one embodiment of the present disclosure.

FIG. 1 depicts a flow chart of a method for botnet message analysis and visualization according to one embodiment of the present disclosure. At step 102, network traffic is filtered to identify messages that match filter criteria. For example, filter criteria may include source and destination IP addresses, port number, and information related to the content and attributes of a message. Filter criteria are initially designated by a user and may be updated or reconfigured over time for various reasons. For example, filter criteria may be changed to reflect new knowledge obtained by analysis of botnet communications. In one embodiment, multiple filters are implemented to identify messages matching criteria as designated by each of the multiple filters.

At step 104, a list of the messages matching the filter criteria are compiled. In one embodiment, the list of messages is stored in memory before being processed as described below. After the list of messages matching the filter criteria is compiled, the process proceeds to step 106.

At step 106, the messages contained in the list compiled at step 104 are tokenized. Tokenization is the process of assigning tokens to a message or specific portions of a message. For example, if a message concerns a denial-of-service attack and contains the count of the number of packets sent, the count can be replaced by a token. Tokenization allows messages that are generally similar in one or more aspects to be categorized based on the similar aspects common to the messages. Tokenization may also be used to remove differences between messages. For example, tokenization may be used to convert text in a message to lower case or remove punctuation from a message. After the messages are tokenized, the process proceeds to step 108.

At step 108, the filtered messages are classified based on classifying criteria. Classifying criteria, in one embodiment, comprises pattern matching (also referred to as PAT in FIGS. 2-7), port matching (referred to as PORT in FIGS. 2-7), IP address, and direction (referred to as FROM/TO in FIGS. 2-7). Messages matching one or more specific values for each of the criteria may be grouped together. The process then proceeds to step 110.

At step 110 the messages tokenized in step 108 are aggregated over time to facilitate detection of patterns. For example, tokenized messages may be grouped into time intervals of varying granularity such as minute, hour, or day. The tokenized messages may also be grouped into multiple intervals such as 5 minutes, 10 minutes, 1 hour, or 1 day. The tokens aggregated over time are then analyzed in step 112 to identify frequency changes of the tokens over time.

At step 114, the changes in frequency of the tokens identified in step 112 are grouped into time intervals (e.g., particular minute, hour, day, or multiple minutes, hours, or days) to facilitate the generation of a display of changes in frequency of tokens over time.

At step 116, a display of the changes in frequency of the tokens as a function of time is generated for display to a user via a user interface (described in detail below in connection with FIGS. 2-7). A user may then interact with the user interface to view more detailed information or view information based on user specified criteria. At step 118, the user input received while the user is interacting with the user interface is recorded. Selected portions of the received user input may then be used to refine the displayed data, by filtering at step 120, adjusting tokenization at step 122, or separating the graph into subgraphs at step 124. In one embodiment, steps 120, 122, and 124 may be repeated. In one embodiment, one or more tokenization schemes may be used. In embodiments having one or more tokenization schemes that may be used, users are provided with a list of tokenization schemes from which to choose. In one embodiment, filtering (e.g., steps 102 and 120) and tokenization (e.g., steps 106 and 122) are based on configuration files which may be edited manually by an expert. In one embodiment, configuration file editing may be based on information derived using the display generated in step 116.

It should be noted that steps 106 through 116, in one embodiment, are facilitated using the tool CoClTe (Coordinating Changes in Text). The CoClTe tool is described in detail in U.S. Patent Application Publication No. 2009/0018819, filed Jul. 11, 2007, entitled Tracking Changes in Stratified Data-Streams and U.S. patent application Ser. No. 12/325,157, filed Nov. 29, 2008, entitled Systems and Methods for Detecting and Coordinating Changes in Lexical Items, both of which are incorporated herein by reference.

Figure 2:
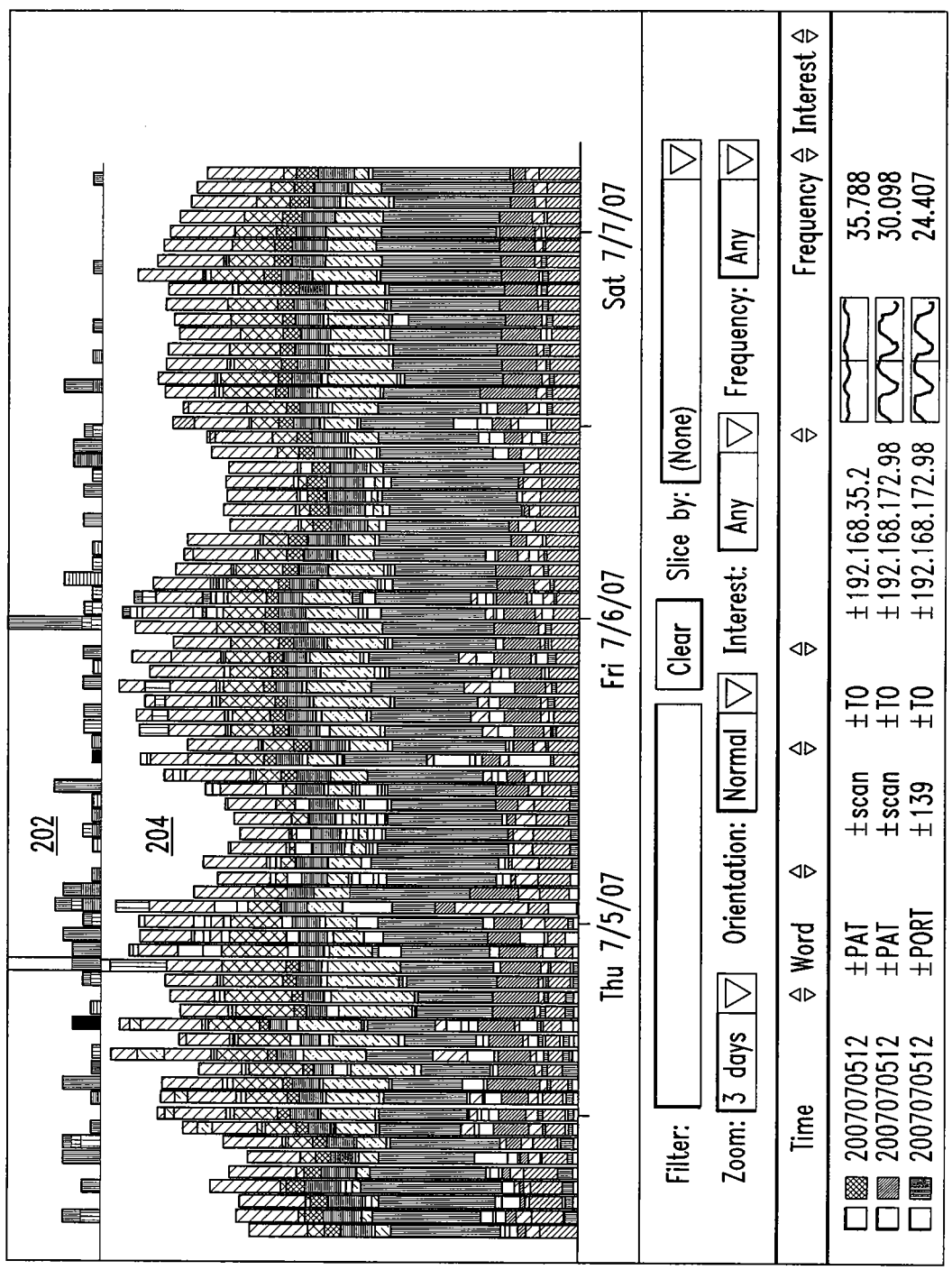
FIG. 2 depicts a user interface according to one embodiment of the present disclosure.

FIG. 2 shows a basic view of user interface (UI) 200 generated in step 116. In this embodiment, UI 200 is shown displayed in a Mozilla Firefox web browser. In other embodiments, UI 200 may be displayed using other web browsers or interfaces. At the top of UI 200 are graphs 202 and 204.

Graph 204 indicates the number of messages that have been identified as potential communications among botnet entities in a botnet with each column representing messages grouped within a particular timeslot, in this case, each column representing one hour. Each message has been classified with a type (e.g., PAT for matching a pattern, PORT for an attempted attack on a given network port), a parameter with type-specific detail (e.g., the type of pattern or the port number for a PORT message), an IP address, and a direction (FROM/TO). Each combination of these four pieces of data from the classifier is assigned a unique color or fill pattern, and each column is split into segments. The relative frequency of each kind of message is used to determine the size of the segments.

Above graph 204 is graph 202 comprised of multiple columns. Each column indicates the number of change events (i.e. interesting increases, decreases, trend changes, etc.) within a particular timeslot, in this case, each column representing one hour. In this embodiment, different colors or fill patterns represent different magnitudes of increases or decreases of events. In other embodiments, change event data in graph 202 may be integrated in other various ways described below in conjunction with FIGS. 4-7.

Figure 3:
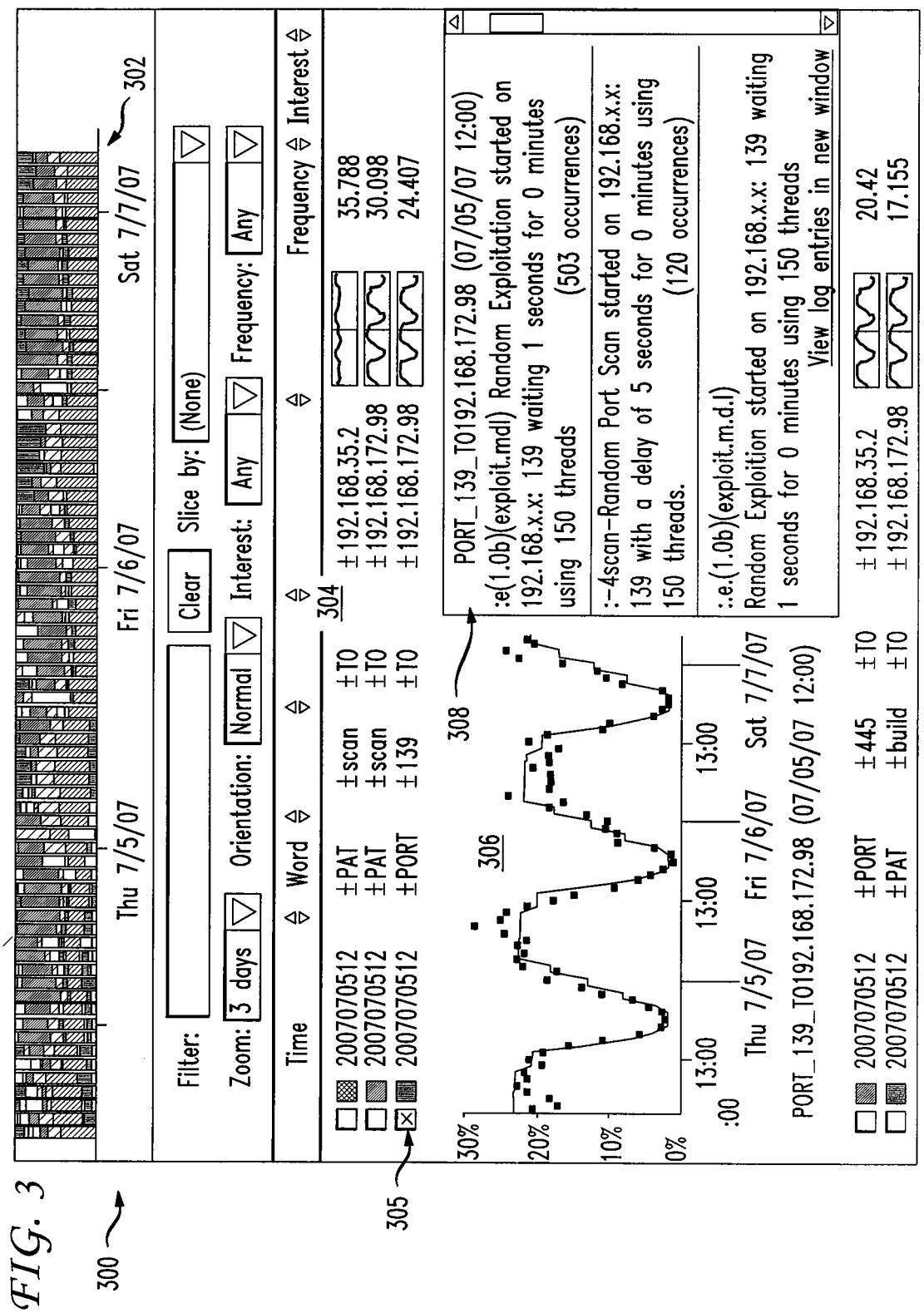
FIG. 3 shows a user interface displayed in response to a user selection made in connection with the user interface of FIG. 2.

FIG. 3 depicts UI 300 which is a display generated after a column associated with a timeslot, or multiple columns associated with a range of timeslots, is selected. In one embodiment, a particular column associated with a timeslot may be selected by moving a pointer over the column and left clicking a mouse. In one embodiment, multiple columns may be selected moving a pointer over a column, left clicking a mouse, and dragging the pointer across the additional desired columns. In other embodiments, other methods of selection may be used such by pressing the tab key to highlight various selectable displayed objects and pressing enter to select the currently highlighted object. The selected timeslots are displayed in graph 302 with details shown in table 304 below graph 302. Each row of table 304 can be expanded to show more detail. FIG. 3 depicts one of checkboxes 305 selected indicating that a user would like to view information pertaining to that row associated with the selected checkbox. Checking one of checkboxes 305 causes data corresponding to that row to be displayed in a graph, such as graph 306 which shows a graphical view of changes in the frequency of the messages, along with the raw message data. Additional information pertaining to the data displayed in graph 306 is provided in scrollable text 308.

Figure 5:
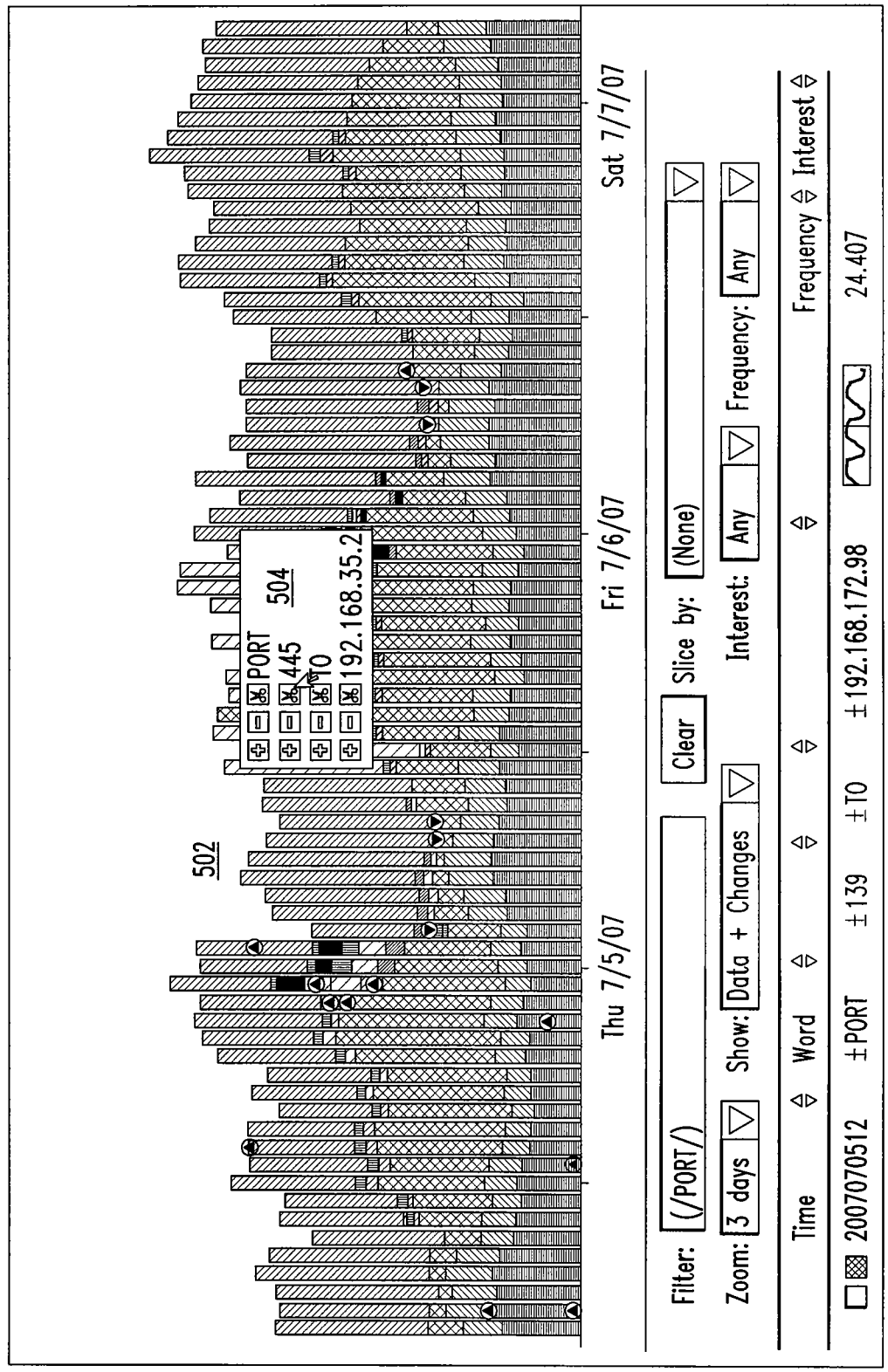
FIG. 5 shows a user interface displayed in response to a user selection made in connection with the user interface of FIG. 4.
Figure 6:
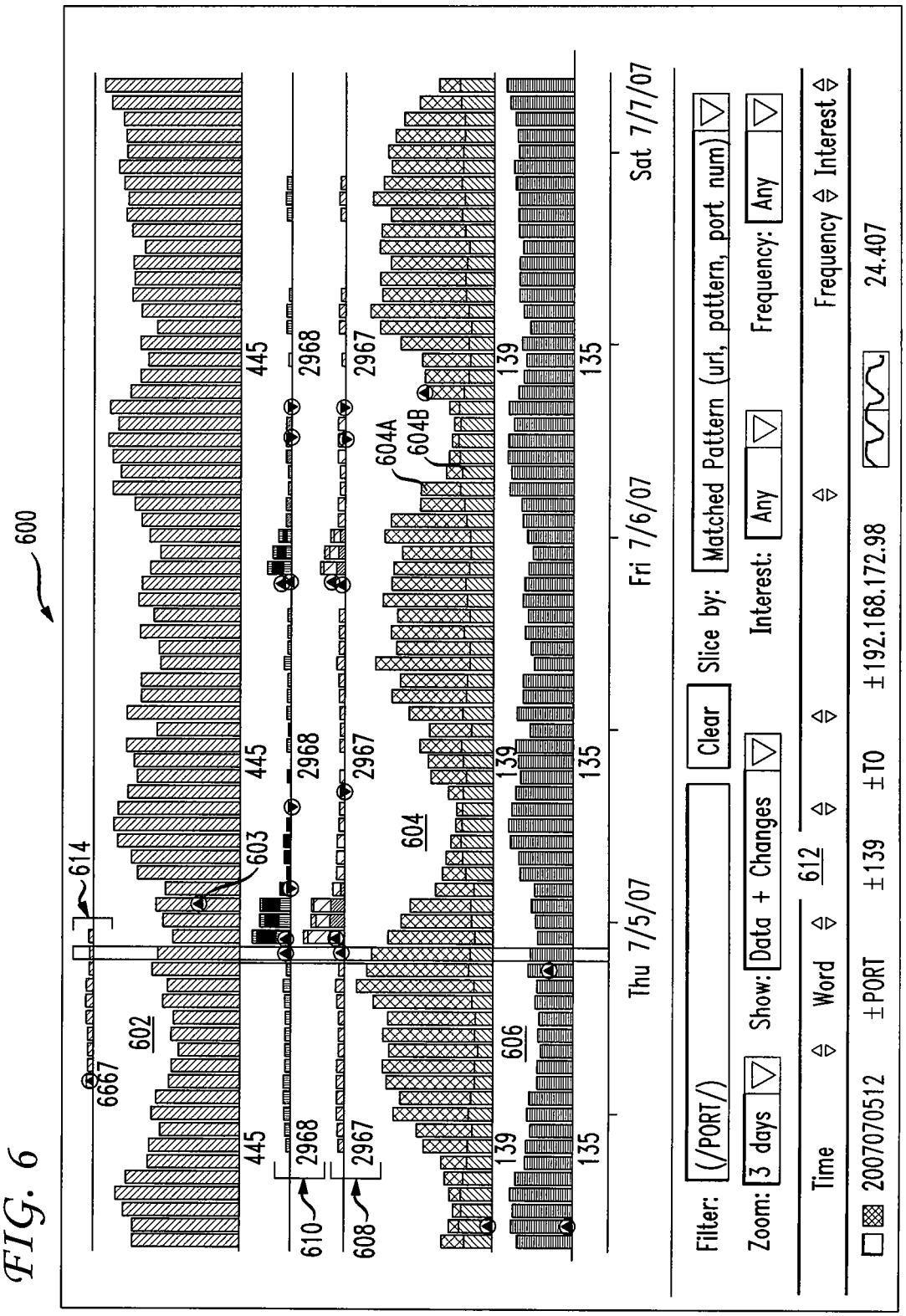
FIG. 6 shows a user interface displayed in response to a user selection made in connection with the user interface of FIG. 5.

Grouping the raw messages according to classification makes the data considerably less bulky, but there are still usually many different things happening in each timeslot. The user may be able to discern some of the more prominent patterns based on the "flow" of different colors or fill patterns in the graph. Less prominent patterns, however, are still difficult to spot. Interactive filtering and slicing operations may be performed as shown in FIGS. 4-6, allowing the user to drill down into the data.

Figure 4:
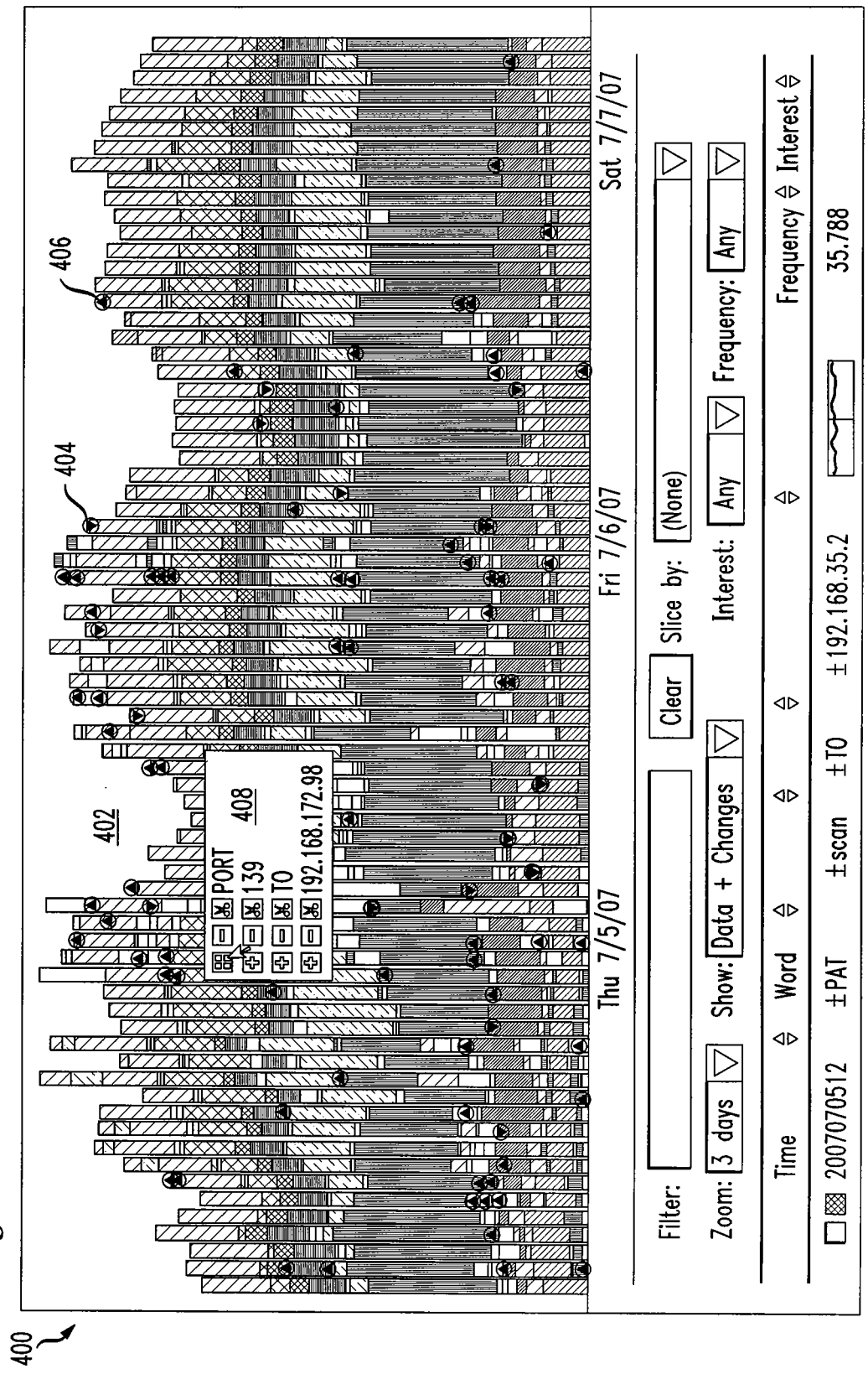
FIG. 4 shows a user interface displayed in response to a user selection made in connection with the user interface of FIG. 3.

FIG. 4 depicts UI 400 displaying graph 402 which combines the information depicted in graphs 204 and 202 of FIG. 2. Graph 202 of FIG. 2 has been replaced by arrows (e.g. downward pointing arrow icon 404 and upward pointing arrow icon 406) overlaid on timeslots of graph 402. In one embodiment, moving a pointer over a particular column associated with a particular timeslot and right mouse clicking on a segment in the graph causes pop-up menu 408 to open. Pop-up menu 408 shows the classifier output for a single segment. Although not shown, Shift-right-click shows a larger pop-up that includes all of the data in the timeslot. For each message type classification, three operations are available: Filter the data to include only messages that match a given value, filter the data to exclude messages that match a given value, and slice the data based on the values of a given component of the classifier output.

In FIG. 4, the user is indicating that they want to filter the data so that the only messages that were classified as "PORT" messages are shown.

As noted above, FIG. 4 uses a slightly different technique to show the change events identified by CoClTe. Rather than extracting these in a separate linked graph as shown in FIG. 2, the change events are indicated by up and down arrow icons 406 and 404 respectively. The two approaches are complementary: the separate graph view, shown in FIG. 2, makes it easier to see where relatively large or small numbers of changes have been identified, while the overlaid-icon view of FIG. 4 makes it easier to see the changes in context.

FIG. 5 shows UI 500 depicting graph 502 which displays the results of the filtering operation initiated in FIG. 4 using pop up 408. All of the messages that were not identified as "PORT" messages have been removed. With the other data gone, prominent patterns—such as the wide bands at the top and bottom of the graphed data—are still easily visible, but more subtle patterns emerge.

In FIG. 5, the user has opened popup 504 by moving the user interface pointer over a desired column associated with a particular timeslot and clicking the right mouse button. This time, the user chooses the slice operation, applied to the second component, "445", of the data arranged by classification. It should be noted that since UI 500 currently depicts only PORT events, that second component in the list depicted in popup 504 is always the number of the network port which is being tested or attacked.

In this embodiment, a network "port" in this context corresponds to a particular piece of software that is listening for network connections on a machine. Consider, for example, a server machine that is running both web server software and email server software. These two pieces of software would be listening on different port numbers, so traffic bound for one can be distinguished from traffic bound for the other. An analogy would be that the machine's IP address is like an apartment building's street number, while a piece of server software's port number is like an apartment number within the building.

FIG. 6 depicts UI 600 which shows the results of the slice operation selected as described above in connection with FIG. 5. This is the same data as shown in FIG. 5, sliced (also referred to as disaggregated) along the dimension of the port number. Here we can clearly see a number of definite patterns.

There are steady, cyclical attacks or probes to a single machine on each of port 445 and 135 as shown in graphs 602 and 606 respectively. Even though these appear fairly consistent, arrow icons, such as upward facing arrow icon 603, indicate that CoCite has identified change events that should be investigated further.

Attacks/probes to port 139 are similarly cyclical as shown in graph 604, but segments 604A and 604B indicate that two different IP addresses are involved. The attack represented by 604B appear to have some correlation to the attacks on port 135 shown in graph 606, while the attack represented by 604A appears to be somewhat counter-cyclical.

Attack/probes to ports 2967 and 2968 are far less common as shown in graphs 608 and 609 respectively. These are correlated, and also appear to involve three different IP addresses.

There is a small burst of attacks/probes to port 6667 as shown in graph 614.

A useful interpretation of this data would require inspection of the details in table 612 below graphs 602-610. One plausible scenario, for example, might be that the burst of probes to port 6667 shown in graph 614 represent a new kind of botnet attack, one that exploits a previously unknown bug in some piece of software on the victim machine. This burst would have been very difficult to detect in the views shown in the previous screenshots.

Figure 7:
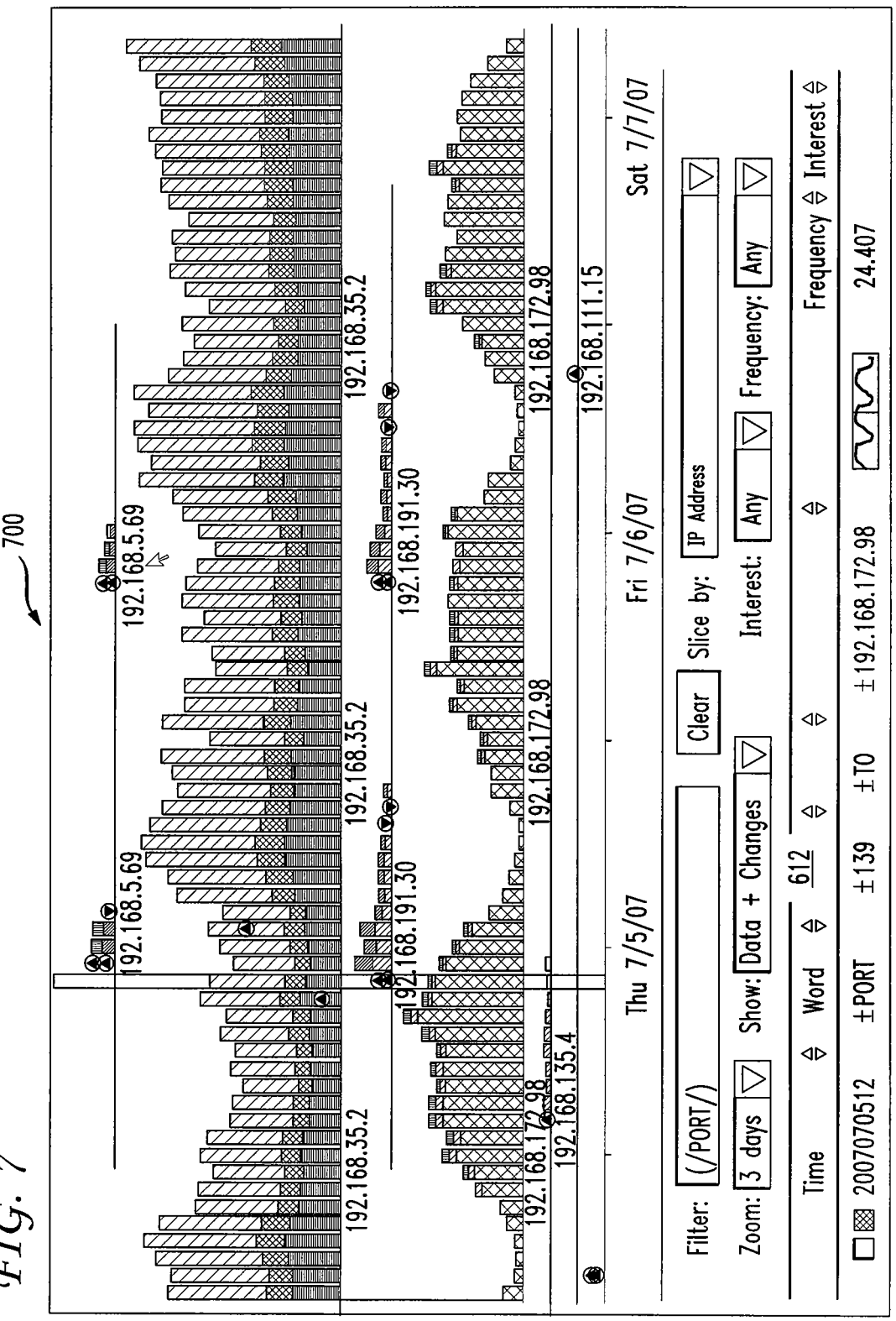
FIG. 7 shows a user interface similar to the user interface of FIG. 6 with data sorted according to a different classification.

FIG. 7 shows that same block of data depicted in FIG. 6, this time sliced by IP address rather than port number. Switching between the views shown in FIG. 7 and FIG. 6, and reviewing the details in the tables below the graphs of FIGS. 6 and 7, a user could see that most of the machines were being probed on a group of ports. The small port-6667 burst stands out as apparently the attack on this port was limited, during this time period, to a single machine. This might provide additional support to the theory that this is a new kind of attack.

The data concerning potential attacks determined using the user interfaces displayed in FIG. 2-7 may then be used to adjust filtering in step 102 and tokenization in step 106.

Figure 8:
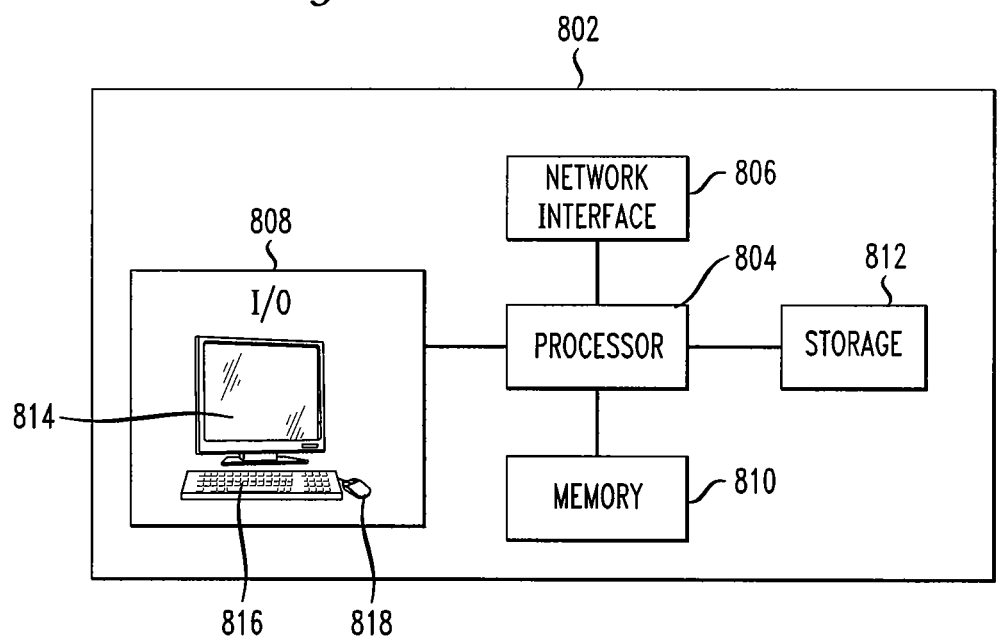
FIG. 8 shows a high-level block diagram of a computer used to implement the method depicted in FIG. 1.

The steps of method 100 shown in FIG. 1 may be implemented using a computer. A high-level block diagram of such a computer is illustrated in FIG. 8. Computer 802 contains a processor 804 which controls the overall operation of the computer 802 by executing computer program instructions which define such operation. The computer program instructions may be stored in a storage device 812, or other computer readable medium (e.g., magnetic disk, CD ROM, etc.), and loaded into memory 810 when execution of the computer program instructions is desired. Thus, the method steps of FIG. 1 can be defined by the computer program instructions stored in the memory 810 and/or storage 812 and controlled by the processor 804 executing the computer program instructions. For example, the computer program instructions can be implemented as computer executable code programmed by one skilled in the art to perform an algorithm defined by the method steps of FIG. 1. Accordingly, by executing the computer program instructions, the processor 804 executes an algorithm defined by the method steps of FIG. 1. The computer 802 also includes one or more network interfaces 806 for communicating with other devices via a network. The computer 802 also includes input/output devices 808 that enable user interaction with the computer 802. In one embodiment, input output devices include keyboard 816, mouse 818 and display 814. In one embodiment, display 814 is used to output the user interfaces shown in FIGS. 2-7 with keyboard 816 and mouse 818 facilitating user input. input/output devices 808 may also include other devices such as speakers, light pen, etc. One skilled in the art will recognize that an implementation of an actual computer could contain other components as well, and that FIG. 8 is a high level representation of some of the components of such a computer for illustrative purposes.

The foregoing Detailed Description is to be understood as being in every respect illustrative and exemplary, but not restrictive, and the scope of the general inventive concept disclosed herein is not to be determined from the Detailed Description, but rather from the claims as interpreted according to the full breadth permitted by the patent laws. It is to be understood that the embodiments shown and described herein are only illustrative of the principles of the present disclosure and that various modifications may be implemented by those skilled in the art without departing from the scope and spirit of the general inventive concept. Those skilled in the art could implement various other feature combinations without departing from the scope and spirit of the general inventive concept.

The invention claimed is:

1. A method for botnet message analysis and visualization comprising:

filtering network traffic comprised of messages;

compiling a list of messages from the network traffic based on each message in the list of messages matching filtering criteria;

tokenizing, by a processor, each message in the list of messages to generate tokenized messages;

aggregating, by the processor, the tokenized messages into groups to generate aggregated groups of tokenized messages;

identifying, by the processor, frequency changes in content and attributes of the tokenized messages in the aggregated groups of tokenized messages to generate identified frequency changes;

grouping, by the processor, the identified frequency changes in the aggregated groups of tokenized messages;

generating, by the processor, a user display of the aggregated groups of tokenized messages and of the identified frequency changes in the aggregated groups of tokenized messages as a function of time wherein each of the aggregated groups of identified frequency changes is displayed in a particular timeslot;

displaying the aggregated groups of tokenized messages in a graph with columns representing timeslots based on a time each of the tokenized messages was originally sent;

receiving user input requesting additional detail for messages received in a particular timeslot, by indicating a respective column on the graph, where each column is associated with a respective timeslot;

displaying additional detail for messages contained in columns indicated by user input;

receiving user input requesting a display of classifications for a single segment of a column associated with a timeslot;

displaying the classifications for a single segment of a column associated with a timeslot in response to receiving user input requesting a display of classification for a single segment;

displaying an icon indicating a change in frequency of an aggregated group of tokenized messages in a particular timeslot compared to a frequency of an aggregated group of tokenized messages in a previous timeslot;

recording user input received while a user is interacting with the user display;

modifying the filtering based on selected recorded user input received while the user is interacting with the user display;

modifying the tokenizing based on selected recorded user input received while the user is interacting with the user display;

separating the graph into subgraphs based on selected recorded user input received while the user is interacting with the user display; and refining the graph based on the modifying the filtering, modifying the tokenizing, and separating the graph into subgraphs.

2. The method of claim 1 further comprising:
classifying the tokenized messages.

3. The method of claim 1 wherein each of the timeslots is comprised of messages sent within a specified time frame.

4. The method of claim 1 further comprising:
receiving user input requesting modification of filtering criteria; and
modifying the filtering criteria based on the user input requesting modification of the filtering criteria.

5. The method of claim 1 further comprising:
receiving user input requesting modification of tokenization criteria; and
modifying the tokenization criteria based on the user input requesting modification of the tokenization criteria.

6. A device for botnet message analysis and visualization comprising:
a processor; and
a memory to store computer program instructions, the computer program instructions when executed on the processor cause the processor to perform operations comprising:
filtering network traffic comprised of messages;
compiling a list of messages from the network traffic based on each message in the list of messages matching filtering criteria;
tokenizing each message in the list of messages to generate tokenized messages;
aggregating the tokenized messages into groups to generate aggregated groups of tokenized messages;
identifying frequency changes in content and attributes of the tokenized messages in the aggregated groups of tokenized messages to generate identified frequency changes;
grouping the identified frequency changes in the aggregated groups of tokenized messages;
generating a user display of the aggregated groups of tokenized messages and of the identified frequency changes in the aggregated groups of tokenized messages as a function of time wherein each of the aggregated groups of identified frequency changes is displayed in a particular timeslot;

displaying the aggregated groups of tokenized messages in a graph with columns representing timeslots based on a time each of the tokenized messages was originally sent;

receiving user input requesting additional detail for messages received in a particular timeslot, by indicating a respective column on the graph, where each column is associated with a respective timeslot;

displaying additional detail for messages contained in columns indicated by user input;

receiving user input requesting a display of classifications for a single segment of a column associated with a timeslot;

displaying the classifications for a single segment of a column associated with a timeslot in response to receiving user input requesting a display of classification for a single segment;

displaying an icon indicating a change in frequency of an aggregated group of tokenized messages in a particular timeslot compared to a frequency of an aggregated group of tokenized messages in a previous timeslot;

recording user input received while a user is interacting with the user display;

modifying the filtering based on selected recorded user input received while the user is interacting with the user display;

modifying the tokenizing based on selected recorded user input received while the user is interacting with the user display;

separating the graph into subgraphs based on selected recorded user input received while the user is interacting with the user display; and refining the graph based on the modifying the filtering, modifying the tokenizing, and separating the graph into subgraphs.

7. The device of claim 6, the operations further comprising:
classifying the tokenized messages.

8. The device of claim 6 wherein each of the timeslots is comprised of messages sent within a specified time frame.

9. A computer readable storage device storing computer program instructions for botnet message analysis and visualization, which, when executed on a processor, cause the processor to perform operations comprising:
filtering network traffic comprised of messages;
compiling a list of messages from the network traffic based on each message in the list of messages matching filtering criteria;
tokenizing each message in the list of messages to generate tokenized messages;
aggregating the tokenized messages into groups to generate aggregated groups of tokenized messages;
identifying frequency changes in content and attributes of the tokenized messages in the aggregated groups of tokenized messages to generate identified frequency changes;
grouping the identified frequency changes in the aggregated groups of tokenized messages;
generating a user display of the aggregated groups of tokenized messages and of the identified frequency changes in the aggregated groups of tokenized messages as a function of time wherein each of the aggregated groups of identified frequency changes is displayed in a particular timeslot;

displaying the aggregated groups of tokenized messages in a graph with columns representing timeslots based on a time each of the tokenized messages was originally sent;

receiving user input requesting additional detail for messages received in a particular timeslot, by indicating a respective column on the graph, where each column is associated with a respective timeslot;

displaying additional detail for messages contained in columns indicated by user input;

receiving user input requesting a display of classifications for a single segment of a column associated with a timeslot;

displaying the classifications for a single segment of a column associated with a timeslot in response to receiving user input requesting a display of classification for a single segment;

displaying an icon indicating a change in frequency of an aggregated group of tokenized messages in a particular timeslot compared to a frequency of an aggregated group of tokenized messages in a previous timeslot;

recording user input received while a user is interacting with the user display;

modifying the filtering based on selected recorded user input received while the user is interacting with the user display;

modifying the tokenizing based on selected user input received while the user is interacting with the user display;

separating the graph into subgraphs based on selected recorded user input received while the user is interacting with the user display; and refining the graph based on the modifying the filtering, modifying the tokenizing, and separating the graph into subgraphs.

10. The computer readable storage device of claim 9, the operations further comprising:

classifying the tokenized messages.

* * * * *